Aug. 11, 1964  I. M. WHITE  3,144,040
BUTTERFLY VALVE
Filed Feb. 11, 1958  2 Sheets-Sheet 1
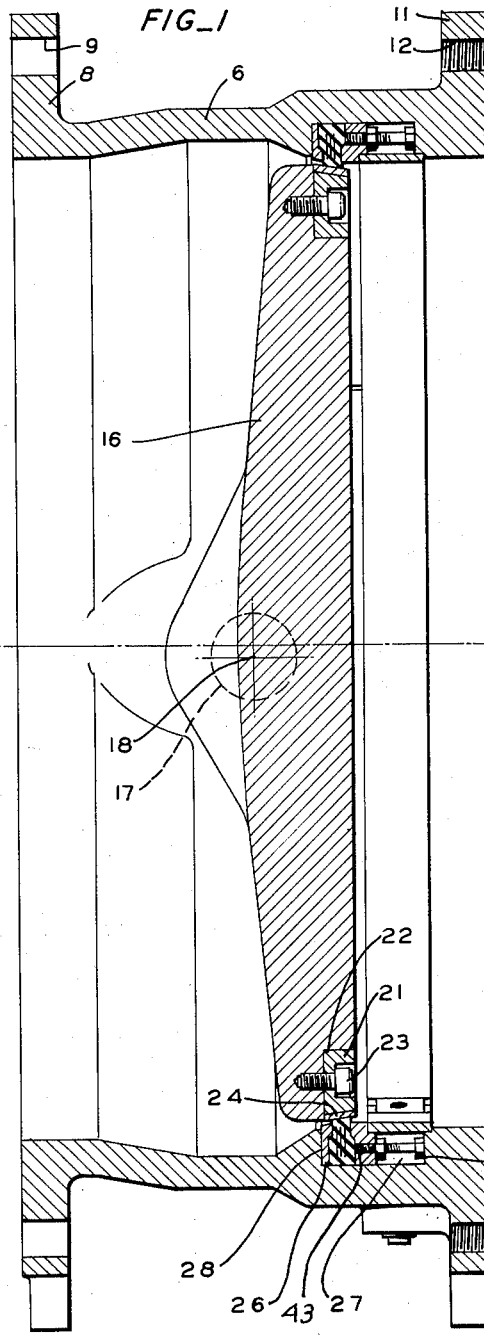
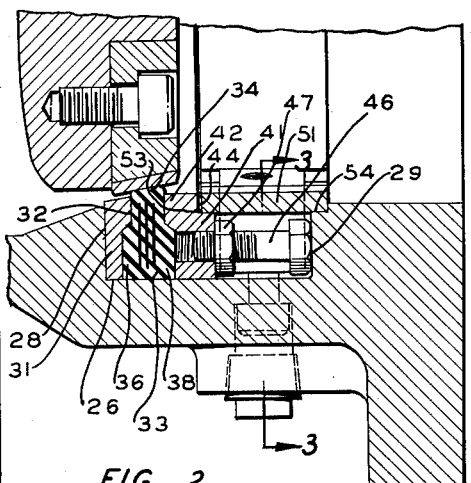
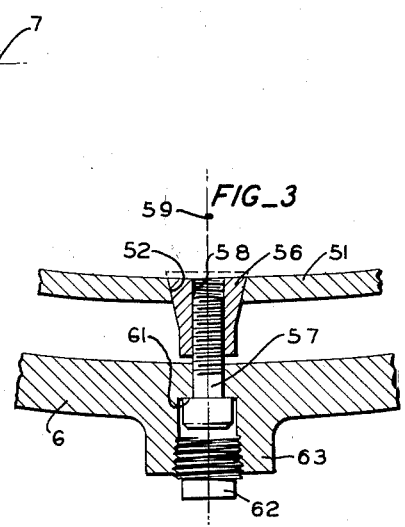
INVENTOR.
IRA MORGAN WHITE
BY Lothrop & West
ATTORNEYS Aug. 11, 1964　　　I. M. WHITE　　　3,144,040
BUTTERFLY VALVE
Filed Feb. 11, 1958　　　2 Sheets-Sheet 2
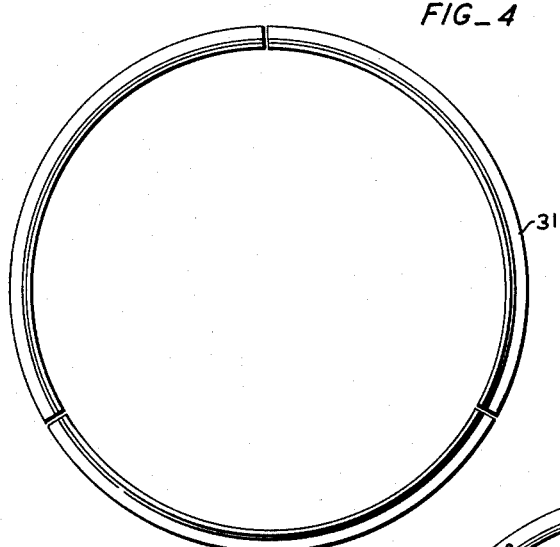
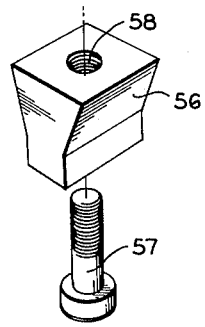
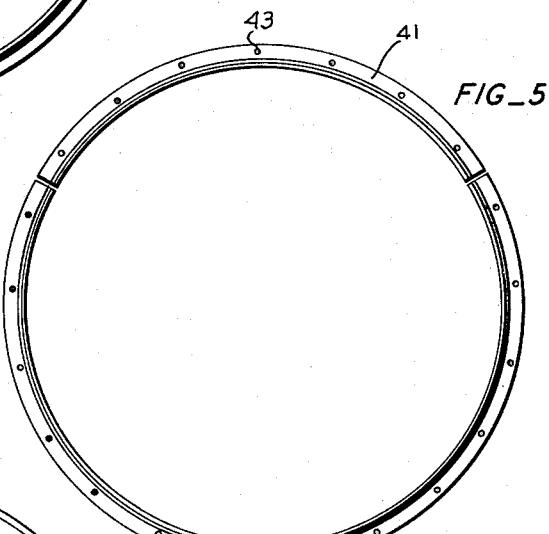
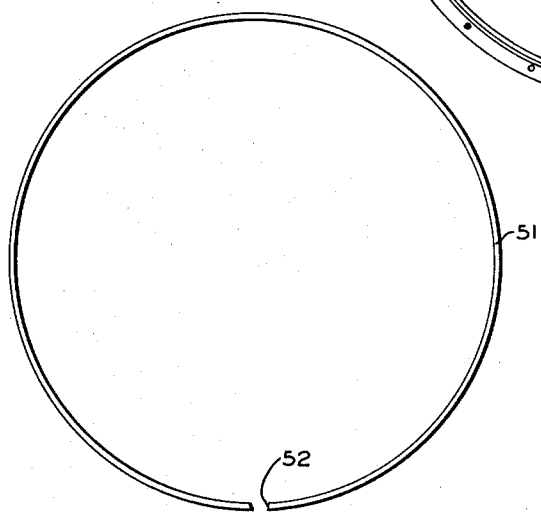
INVENTOR.
IRA MORGAN WHITE
BY Lothrop & West
ATTORNEYS United States Patent Office 3,144,040
Patented Aug. 11, 1964

3,144,040
BUTTERFLY VALVE
Ira Morgan White, Berkeley, Calif., assignor to Baldwin-Lima-Hamilton Corporation, a corporation of Pennsylvania
Filed Feb. 11, 1958, Ser. No. 714,586
9 Claims. (Cl. 137—315)

My invention relates primarily to butterfly valves and valve constructions and especially to the arrangements for providing a suitable seat for the valve disc when the valve disc is in closed position.

Although butterfly valves are well known and many different ways have been proposed and utilized for insuring that they close tightly and inhibit leakage in closed position there is always a need for an improved manner of effectuating an appropriate seat for the valve disc. Some of the factors meriting improvement are ease of manufacture, cost, durability in severe service, consistent repetitive operation, ease of repair and replacement, ease of operation and general compatibility with recognized manufacturing and field techniques.

The principal object of my invention is to achieve improvements in all of these and in other ways.

Another object of the invention is to provide a generally improved butterfly valve and butterfly valve construction.

Other objects, together with the foregoing, are attained in the embodiment of the invention described in the accompanying description and illustrated in the accompanying drawings in which:

FIGURE 1 is a cross-section on a longitudinal, axial plane through a butterfly valve construction in accordance with my invention.

FIGURE 2 is a detail to an enlarged scale of the seat and disc portion of the valve.

FIGURE 3 is a cross-section showing a detail, the plane of the section being indicated by the line 3—3 of FIGURE 2.

FIGURE 4 is an elevation of a multi-part retaining ring.

FIGURE 5 is an elevation of a multi-part pressure ring.

FIGURE 6 is an elevation of a split band.

FIGURE 7 is an isometric view showing an expansion wedge and an operating screw therefor arranged along an assembly axis.

While the butterfly valve of the invention and the construction thereof are susceptible to numerous variations depending upon the particular environment in which they are incorporated and depending on various manufacturing and installation parameters, the structure has been successfully embodied in commercial installations substantially as illustrated in the drawings herein. In a typical case, the valve includes a cylindrical housing 6. This is customarily fabricated of metal and is substantially symmetrical along an axis 7 which usually is a flow axis. The housing is provided with a peripheral flange 8 having fastening apertures 9 therein and also with a peripheral flange 11 having fastening apertures 12 therein. Interiorly, the housing 6 is of generally circular cylindrical contour although it has various slopes and inclinations to accommodate the interior structure.

A butterfly valve disc 16 is disposed within the housing 6 and is arranged for movement between a closed position, as shown in FIGURE 1, and the customary open position. The disc 16 is preferably supported on a mounting means including stub shafts 17 which engage the disc and also find suitable bearing in the housing 6. The axis 18 of the stub shafts about which the disc 16 rotates is preferably displaced from the flow axis or axis of symmetry of the housing 6 and is likewise preferably displaced from the seating periphery of the valve disc itself.

To provide an appropriate seat on the valve disc there is afforded a removable seat ring 21 which fits in a channel 22 turned in the valve disc so that the seat ring 21 is continuous and is continuously supported. Fastenings 23 hold the seat ring 21 removably in place. In many instances a special surface 24 is provided on the seat ring 21. This is either in the nature of a relatively hard, long wearing facing or in some instances is in the nature of a relatively soft, resilient material, such as rubber.

In order that the seat 21 will be well engaged when the valve is in closed position, there is provided a special construction in the housing 6. To that end the housing is formed with an interior, circumferential groove 26. In longitudinal cross-section the groove is preferably substantially rectangular having a cylindrical outer wall 27, one planar end wall 28 and another planar end wall 29. The groove 26 opens to the interior of the passage through the housing 6 and is disposed adjacent the seat of the valve disc 16.

Pursuant to the invention and as especially illustrated to an enlarged scale in FIGURE 2, a retaining ring 31 is provided within the groove 26. As shown particularly in FIGURE 4, this is a multi-part ring comprised, in this instance, of three separate sections having radial separations. The multi-part ring 31 is provided with an overhanging lip 32 so that the radially inner portion of the ring is axially thicker than the radially outer portion thereof. The retaining ring is of a configuration to seat firmly within the groove 26 in abutment with the one wall 28 thereof. In that position, the interior face of the retaining ring substantially continues the wall of the passageway through the valve 6.

Disposed adjacent the retaining ring 31 is a packing ring 33. This preferably is comprised of a single or continuous member made of rubber or rubber-like material reinforced with suitable inserts such as cotton duck or nylon fabric. The packing ring 33 is deformable or yieldable and is contoured so that its inner face 34 is substantially in tight abutment with the seat member 21 of the valve disc when the valve is closed. The packing ring 33 is formed to have a pair of lateral extensions 36 and 38 so that the radially outer portion of the packing ring is axially thicker than the radially inner portion thereof. With this configuration of the packing ring, one of the extensions 36 interengages with the overhanging lip 32 of the multi-part retaining ring 31.

Disposed adjacent the packing ring 33 on the other side thereof there is a multi-part pressure ring 41. This is especially shown in FIGURE 5 and in the present instance is comprised of three portions split along radial lines. The pressure ring 41 not only has a flange 42 which is designed to interengage with the other extension 38 of the packing ring 33, but also has a plurality of threaded axially extending apertures 43 therein evenly spaced around the periphery of the ring.

The pressure ring is disposed in the groove 26 in abutment with the packing ring and is appropriately manipulated by means of a plurality of jack screws 46. These are preferably ordinary machine screws at one end threaded into the threaded apertures 43 and at the other end abutting against the other wall 29 of the groove 26. The jack screws 46 are entirely disposed within the confines of the groove 26 so that they are out of the path of flow through the valve. The jack screws 46 can be appropriately manipulated to exert any desired pressure upon the packing ring 33 so that the packing is held in position and is slightly extruded if necessary to make a tight contact at all points around its periphery with the closed valve disc. After the jack screws 46 have been appropriately set they are held in place by lock nuts 47 readily tightened in position.

To improve the flow characteristics of the interior of the structure, there is provided a split band 51 especially illustrated in FIGURES 3 and 6. This is a continuous metallic band having a split 52 between the ends thereof. The band is approximately rectangular in cross-section and is designed to seat in a groove 53 in the pressure ring and also in a groove 54 in the housing 6, the grooves 53 and 54 being opposite each other. The band 51 is slightly springy and fits in the grooves rather loosely, unless constrained.

The band is tightened by means of a wedge 56 designed to be disposed in the split 52 between the opposite ends of the band and to extend radially of the housing 6. A suitable machine screw 57 is in engagement with a threaded bore 58 in the wedge 56 for relative rotary movement so that the wedge and the bolt approach and recede from each other along an axis 59. The machine screw 57 abuts a flange 61 formed in the housing 6 and access thereto is had upon removal of a pipe plug 62 threaded into a boss 63 projecting from the housing 6. With this arrangement, when the machine screw 57 is tightened the wedge 56 is moved radially outward and expands the band 51 in the grooves 53 and 54. Not only is there a tight interengagement made but there is provided a relatively smooth flow passageway and the jack screws are well protected.

When the mechanism is to be disassembled, repaired or adjusted, any mechanism secured to the flange 11 is removed and the pipe plug 62 is likewise removed. The machine screw 57 is slacked off so that the wedge 56 in travelling radially inwardly along the axis 59 releases the split ends of the band 51. This is sufficiently springy slightly to relax and contract. The wedge 56 can be entirely removed and the band 51 also. That affords access to the jack screws. The lock nuts 47 are slacked off and some of the jack screws 46 are likewise rotated to permit retraction of one portion of the pressure ring 41. When this one portion of the pressure ring has been sufficiently retracted or axially displaced far enough to be completely out of alignment with the remaining portions thereof, that part of the pressure ring and its associated jack screws and lock nuts can then be lifted radially out of the groove 26 and moved axially out of the housing 6. Similar treatment of the remaining portions of the pressure ring, but with mere loosening of the jack screws, permits removal thereof as well. Thereupon the deformable and flexible packing ring 33 is readily removed from the groove 26 through the opening in the housing 6. The retaining ring 31 can likewise be removed a part at a time. The valve seating structure is then completely disassembled. It can be replaced by operations in the reverse order.

There is consequently provided in accordance with the invention a butterfly valve and butterfly valve construction particularly constituting an improvement in the various particulars mentioned hereinabove and in other particulars. In commercial use the valve has proved to be particularly tight in its sealing or closed position, easily opened and readily repaired and inspected.

What is claimed is:

1. A butterfly valve comprising a cylindrical housing having a continuous interior circumferential groove substantially rectangular in axial cross-section, a multi-part retaining ring in said groove, a deformable packing ring in said groove adjacent said retaining ring, a multi-part pressure ring in said groove adjacent said packing ring, jack screws engaging said pressure ring and abutting one wall of said groove, a split closure band overlying said jack screws and extending substantially from said wall to said pressure ring, and means for expanding said closure band into engagement with said housing and said pressure ring.

2. A butterfly valve comprising a cylindrical housing having a continuous interior circumferential groove partially defined by parallel walls extending transversely of said housing, a packing ring in said groove adjacent one of said walls, a pressure ring in said groove and in abutment with said packing ring, jack screws disposed entirely within said groove and engaging said pressure ring and the other of said walls, said jack screws being effective to urge said packing ring toward said one wall, a split closure band overlying said jack screws and extending substantially from said other wall to said pressure ring, and means for expanding said closure band into engagement with said housing and said pressure ring.

3. A butterfly valve construction comprising a housing having an interior circumferential groove with opposite walls, a multi-part retaining ring in said groove against one of said walls, a deformable packing ring in said groove adjacent said retaining ring, a multi-part pressure ring in said groove adjacent said packing ring, and a plurality of jack screws in said groove and engaging said pressure ring and the other of said walls.

4. A butterfly valve construction comprising a housing having an interior circumferential groove with opposite walls, a retaining ring in said groove against one of said walls, a deformable packing ring in said groove adjacent said retaining ring, a pressure ring in said groove against said packing ring, jack screws in said groove engaging said pressure ring and said other wall, a split closure band overlying said groove, a wedge engaging the ends of said band, and means engaging said wedge and said housing for moving said wedge to expand said band.

5. A butterfly valve construction comprising a housing having an interior circumferential groove with opposite walls, a retaining ring in said groove against one of said walls, an overhanging lip on said retaining ring, a packing ring in said groove and having lateral extensions one of which interengages with said lip, a pressure ring in said groove, a flange on said pressure ring interengaging with the other of said extensions, and a plurality of jack screws in said groove in engagement with said pressure ring and the other of said walls.

6. A butterfly valve construction comprising a housing having an interior circumferential groove with opposite walls, a packing ring in said groove and projecting inwardly therefrom, a pressure ring in said groove adjacent said packing ring, and means including a plurality of jack screws engaging said pressure ring and engaging one of said walls for urging said packing ring toward the other of said walls.

7. A butterfly valve construction comprising a housing having an interior circumferential groove with opposite walls, a packing ring in said groove, and means for forcing said packing ring toward one of said walls including a plurality of jack screws disposed entirely within said groove and engaging the other of said walls.

8. A butterfly valve construction comprising a housing having an axis and an interior circumferential groove with opposite walls normal to said axis, a packing ring in said groove, and means for forcing said packing ring toward one of said walls including a jack screw disposed entirely within said groove and engaging the other of said walls.

9. A valve seat for a butterfly valve having a valve body carrying a valve disc, comprising: a valve seat of resilient material in the interior of said valve body, said body having an annular groove in its interior surface receiving said valve seat with the resilient material extending radially inwardly beyond the interior surface of said valve body, said body groove including opposite side walls and having a width in excess of the width of the valve seat material; valve seat retaining means in said body groove having one portion abutting one side wall, a second portion abutting the valve seat comprising a plurality of arcuate segments arranged end-to-end, and adjustable means on the retaining means for adjustably forcing the different segments of the second portion against the valve seat to compress selectively different portions of the seat toward the other side wall and thereby adjust the internal diameter thereof.

References Cited in the file of this patent

UNITED STATES PATENTS

| | | |
|---|---|---|
| 1,188,462 | McCormick | June 27, 1916 |
| 1,546,594 | McAulay | July 21, 1925 |
| 1,575,259 | Fisher | Mar. 2, 1926 |
| 2,081,842 | Sharp | May 25, 1937 |
| 2,853,267 | Herren | Sept. 23, 1958 |

FOREIGN PATENTS

| | | |
|---|---|---|
| 12,538 | Great Britain | Oct. 2, 1886 |